S. De VEAUX.
Check-Row Attachment for Planters.

No. 196,341. Patented Oct. 23, 1877.

UNITED STATES PATENT OFFICE.

SAMUEL DE VEAUX, OF LA FAYETTE, ASSIGNOR OF ONE-HALF HIS RIGHT TO GEORGE W. RICE, OF BATTLE GROUND, INDIANA.

IMPROVEMENT IN CHECK-ROW ATTACHMENTS FOR PLANTERS.

Specification forming part of Letters Patent No. 196,341, dated October 23, 1877; application filed August 3, 1877.

*To all whom it may concern:*

Figure 1:
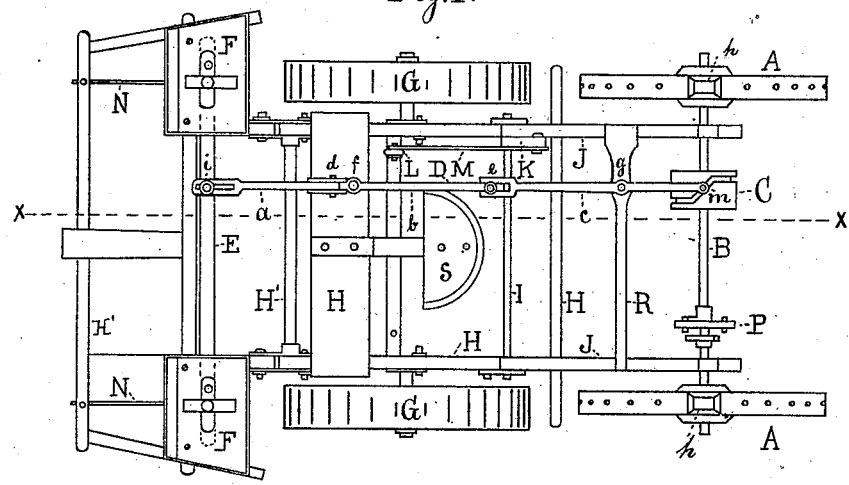
Figure 2:
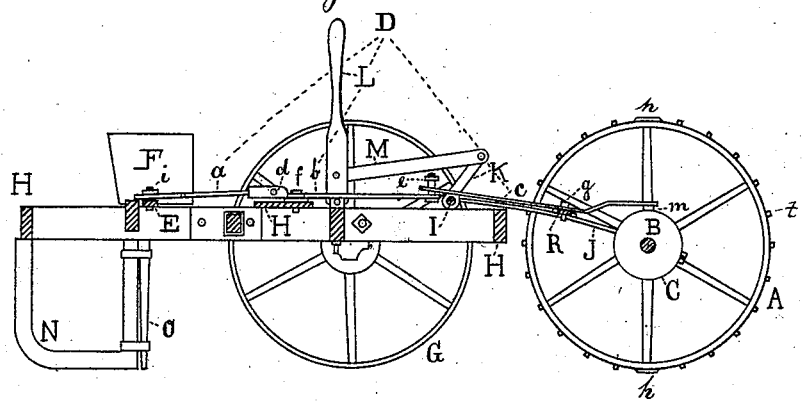

Be it known that I, SAMUEL DE VEAUX, of the city of La Fayette, county of Tippecanoe, and State of Indiana, have invented certain new and useful Improvements in Check-Row Attachments for Planters, of which the following is a specification:

Reference being had to the accompanying drawings, which are made a part hereof, and on which similar letters of reference indicate similar parts, Figure 1 is a top view of a planter embodying my invention; and Fig. 2, a sectional plan view, looking from a point shown by the dotted line $x\ x$ toward the upper side of Fig. 1.

H is the main frame, supported by the wheels G G, and having pivoted to the front the frame H′, carrying the seed-boxes F F, the slide E, and the shoes N and tubes O. The seed-box frame is raised by means of the ordinary lever. (Not shown in the drawings.) As these parts constitute no part of my invention, further description is not necessary.

The improved check-row attachment consists of a frame, J J R, having bearings for a shaft, B, carrying wheels A A, and suitably pivoted to the rear of the frame H, so as to be raised by a lever, L, operating through a link, M, and arm K, the frame H remaining in a horizontal position. The wheels A are placed directly behind the wheels G, so that they may run on the smooth surface made by the front wheels, and may be provided with lugs or teeth $t$, to break up the surface without penetrating enough to disturb the seed, thus preventing the ground from baking over the seed.

The rotation of the wheels is made the means of regulating the dropping of the seed by providing the shaft B with a cam, from which the seed-slide E is operated. This cam may be a grooved cam, as at C, or a toothed cam or eccentric, as at P, in either case motion being communicated to the slide E through a jointed lever, D, which consists of three sections, $a\ b\ c$, so connected that the horizontal vibration is not affected by the change of position in the three frames H′, H, and J, as the apparatus passes over uneven ground. By means of the lever L the operator can lift the frame J R, either to turn round or to set the wheels so that the marks $h$, or any suitable indicating device, may be brought to a proper position to drop the seed at the right times.

The frame J R, shaft B, its cam and wheels, and jointed lever D constitute an attachment adapted to be readily applied to any of the ordinary planters.

I do not claim the combination, in a planter, of three frames and devices whereby the movement of the center frame and said devices will lift both the others from the ground; but

I claim—

1. The within-described check-row attachment for planters, consisting of the frame J, shaft B, its wheels and cam, and the compound jointed lever, all constructed and adapted for attachment to the frame of a planter, and to the seed-slide thereof, substantially as set forth.

2. The combination, with the main and supplementary frames, of the cam C, lever D, having the sections $a\ b\ c$, and slide E, arranged substantially as and for the purpose set forth.

3. The arrangement of the two wheels of a check-row attachment for planters directly in the rear of the wheels of the planter itself, in the manner shown and described, for the purpose set forth.

In witness whereof I have hereunto set my hand and seal, at Indianapolis, Indiana, this 28th day of July, A. D. 1877.

SAMUEL DE VEAUX. [L. S.]

In presence of—
 C. BRADFORD,
 L. DOW MCCLAIN.